United States Patent
Rahamim et al.

(10) Patent No.: US 6,647,101 B2
(45) Date of Patent: *Nov. 11, 2003

(54) DATA ACCESS ARRANGEMENT UTILIZING A SERIALIZED DIGITAL DATA PATH ACROSS AN ISOLATION BARRIER

(75) Inventors: Raphael Rahamim, Orange, CA (US); Thomas Grey Beutler, Tustin, CA (US); Eric Floyd Riggert, Trabuco Canyon, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 10/032,776

(22) Filed: Oct. 26, 2001

(65) Prior Publication Data

US 2002/0126806 A1 Sep. 12, 2002

Related U.S. Application Data

(63) Continuation of application No. 09/193,007, filed on Nov. 16, 1998, now Pat. No. 6,359,973.

(51) Int. Cl.[7] .............................................. H04M 11/00
(52) U.S. Cl. ................................ 379/93.05; 379/93.29; 379/90.01
(58) Field of Search .......................... 379/93.05, 93.28, 379/90.01, 93.31, 93.29, 442–443, 399.01, 399.02; 375/222, 241–242, 340

(56) References Cited

U.S. PATENT DOCUMENTS

| 3,714,540 A | 1/1973 | Galloway |
| 4,192,978 A | 3/1980 | Vincent |
| 4,417,099 A | 11/1983 | Pierce |
| 4,529,845 A | 7/1985 | Boeckmann |
| 4,540,854 A | 9/1985 | Beirne |

(List continued on next page.)

FOREIGN PATENT DOCUMENTS

| EP | 0573721 A1 | 12/1993 |
| EP | 0576882 | 5/1994 |
| EP | 0642272 | 8/1995 |
| GB | 2102230 A | 1/1983 |
| WO | WO97/20396 | 6/1997 |

OTHER PUBLICATIONS

Silicon Laboratories, *Direct Digital Access Arrangement (DDAA)*, Si3032, pp. 1/28.

Siemens, *User's Manual/ICs for Communication*, PSB 4595 Version 2.0 and PSB 4596 Version 2.1, pp. 1/100.

*Primary Examiner*—Melur Ramakrishnaiah
(74) *Attorney, Agent, or Firm*—Christopher J. Rourk; Akin Gump Strauss Hauer & Feld, LLP

(57) ABSTRACT

A modem utilizing a DAA having line side circuitry including a telephone network interface and system side circuitry including a host system interface. The line side circuitry and the system side circuitry are separated by a high voltage isolation barrier. In accordance with the invention, the high voltage isolation barrier and other DAA circuitry are configured such that data and control information may be communicated between the system side circuitry and the line side circuitry using a serialized digital communication protocol. In one embodiment of the invention, the line side circuitry of the modem includes detection and measurement circuitry that is programmable to measure or establish electrical characteristics (e.g., tip/ring voltage and loop current) of the telephone line interface connection. Command information for the programmable circuitry is multiplexed with data communicated across the high voltage isolation barrier. Interrupt signals and information for synchronizing communications between the system side circuitry and the line side circuitry may also comprise a portion of the serialized datastream.

20 Claims, 10 Drawing Sheets

U.S. PATENT DOCUMENTS

| | | |
|---|---|---|
| 4,608,541 A | 8/1986 | Moriwaki et al. |
| 4,644,526 A | 2/1987 | Wu |
| 4,723,267 A | 2/1988 | Jones et al. |
| 4,741,031 A | 4/1988 | Grandstaff |
| 4,757,528 A | 7/1988 | Falater et al. |
| 4,864,605 A | 9/1989 | Ramsay et al. |
| 4,993,063 A | 2/1991 | Kiko |
| 4,995,111 A | 2/1991 | Tojo et al. |
| 5,097,503 A | 3/1992 | Cotty |
| 5,136,630 A | 8/1992 | Breneman et al. |
| 5,204,896 A | 4/1993 | Oliver |
| 5,222,124 A | 6/1993 | Castaneda et al. |
| 5,235,634 A | 8/1993 | Oliver |
| 5,245,654 A | 9/1993 | Wilkison et al. |
| 5,315,651 A | 5/1994 | Rahamim et al. |
| 5,329,585 A | 7/1994 | Susak et al. |
| 5,369,666 A | 11/1994 | Folwell et al. |
| 5,369,687 A | 11/1994 | Farkas |
| 5,410,594 A | 4/1995 | Maruyama |
| 5,451,893 A | 9/1995 | Anderson |
| 5,500,895 A | 3/1996 | Yurgelites |
| 5,506,868 A | 4/1996 | Cox et al. |
| 5,555,293 A | 9/1996 | Krause |
| 5,602,846 A | 2/1997 | Holmquist et al. |
| 5,654,984 A | 8/1997 | Hershbarger et al. |
| 5,655,010 A | 8/1997 | Bingel |
| 5,737,397 A | 4/1998 | Skinner et al. |
| 5,757,803 A | 5/1998 | Russell et al. |
| 5,812,534 A | 9/1998 | Davis |
| 5,870,046 A * | 2/1999 | Scott et al. ................. 341/143 |
| 5,875,235 A | 2/1999 | Mohajeri |
| 5,898,329 A | 4/1999 | Hopkins |
| 6,008,681 A | 12/1999 | Beutler et al. |
| 6,081,586 A | 6/2000 | Rahamim et al. |
| 6,091,806 A * | 7/2000 | Rasmus et al. .......... 379/93.05 |
| 6,107,948 A | 8/2000 | Scott et al. |
| 6,128,373 A | 10/2000 | Mathe et al. |
| 6,198,816 B1 | 3/2001 | Hein et al. |

* cited by examiner

DATA ACCESS ARRANGEMENT UTILIZING A SERIALIZED DIGITAL DATA PATH ACROSS AN ISOLATION BARRIER

INCORPORATIONS BY REFERENCE

The present application is a continuation and claims priority to U.S. patent application Ser. No. 09/193,007, filed Nov. 16, 1998, allowed Aug. 10, 2001.

The following commonly-assigned patent applications are hereby incorporated by reference in their entirety, including drawings and appendices, and are hereby made part of this application for all purposes:

1) U.S. patent application Ser. No. 09/161,209, filed Sep. 25, 1998, pending;
2) U.S. patent application Ser. No. 09/088,629, filed Jun. 2, 1998, now U.S. Pat. No. 6,008,681;
3) U.S. patent application Ser. No. 09/074,896, filed May 8, 1998, now U.S. Pat. No. 6,141,414;
4) U.S. patent application Ser. No. 09/075,451, filed May 8, 1998, now U.S. Pat. No. 6,128,373; and
5) U.S. patent application Ser. No. 09/929,960, filed Sep. 15, 1997, now U.S. Pat. No. 6,061,445.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

The present invention relates generally to modems; and, more particularly, it relates to a data access arrangement wherein data and control information is communicated across a high voltage isolation barrier in a serialized digital format.

2. Related Art

Regulatory agencies throughout the world have established standards and regulations for connecting subscriber equipment to telephone networks. These regulations are intended to prevent damage to the telephone network and mitigate interference with other equipment also connected to the network. The regulations, however, often present difficult design challenges.

For example, subscriber equipment or data communications equipment (DCE), such as a data modem, is generally required to provide for some form of electrical isolation to prevent voltage surges or transients originating from the subscriber equipment from having a deleterious effect on the telephone network. Electrical isolation also addresses potential problems associated with differences in operating voltages between a telephone line and the subscriber equipment. More particularly, telephone line voltages may vary widely across a given network, and often exceed the operating voltage of subscriber equipment. In the United States, 1,500 volt isolation is currently required. In other countries, the prescribed isolation may reach 3,000–4,000 volts.

A number of techniques have been utilized to provide the requisite level of electrical isolation. For example, isolation transformers are often employed to magnetically couple signals between a two-wire telephone line and the analog front end of a modem or other circuit while maintaining an appropriate level of electrical isolation. The isolation transformer functions to block potentially harmful DC components, thereby protecting both sides of the data connection.

The isolation transformer is typically part of what is referred to in the modem arts as a data access arrangement (DAA). The term DAA generally refers to circuitry, which provides an interface between a public telephone network originating in a central office (CO) and a digital data bus of a host system or data terminal equipment (DTE). The DAA electrically isolates a modem or similar device from a phone line to control emissions of electromagnetic interference/radio frequency interference (EMI/RFI). In addition to electrical isolation, the DAA often develops a number of signals (e.g., a ring signal) for provision to subscriber equipment. The DAA may receive signals from the phone line through a telephone jack, such as a RJ11C connection as used for standard telephones.

Typically, a number of circuits must derive information from the telephone line, and isolation is often required for each signal communicated to and from the host system. Such circuits may include: transmit and receive circuitry; ring signal detection circuitry; circuitry for switching between voice and data transmissions; circuits for dialing telephone numbers; line current detection circuitry; circuitry for indicating that the equipment is coupled to a functional telephone line; and line disconnection detection circuitry. Conventional DAA designs utilize separate line side circuits and separate signal paths across a high voltage isolation barrier for each function of the DAA.

Modems function to convert analog signals from the telephone network to a digital format that can be used by the host system. Most countries have specific regulatory requirements governing off-hook voltage and loop current, ring detect threshold levels, and line interface impedances that must be taken into account by devices such as modems. Such electrical characteristics of a DAA are often difficult to control, due in part to the fact that the circuits which determine these characteristics are located on the line side of the high voltage isolation barrier.

Further, it is difficult to configure a DAA to satisfy the regulatory requirements of more than one country. Conventional non-programmable DAA designs are only suitable for a single country a group of countries with similar requirements.

While the isolation transformer of a DAA protects the electronic components of a modem, it often introduces distortion and consumes a relatively large amount of space. In today's world of ever-shrinking electronics, the bulk of the isolation transformer may govern the physical dimensions of the modem itself and impose other unwanted constraints on cost sensitive modem circuitry.

One method for reducing the size of the isolation transformer in a DAA involves coupling certain telephone line signals (e.g., incoming ringing signals) to modem circuitry while utilizing a separate signal path to couple data signals via a capacitively coupled isolation transformer. Although enabling the use of smaller and lighter isolation transformers, this configuration may result in excessive distortion.

Some modem configurations have eliminated the isolation transformer altogether via the use of analog electo-optical isolators. These devices employ an emitter, such as a light emitting diode, and a corresponding photo-detector circuit. This type of isolation, however, may suffer from distortion, cost and complexity issues.

Still other configurations have used an isolation transformer in the main signal path and optical isolators or relays in the ring detection and off-hook driving circuitry. Capacitors have also been utilized to differentially couple analog transmit and receive channels across an isolation barrier. Thermal and resistive isolation techniques have also been employed, but are typically complex and expensive to manufacture.

The requirement of passing analog audio signals across the high voltage isolation barrier for provision to a coder/decoder (CODEC) and other DAA circuitry hampers efforts to decrease the size and cost of the barrier due to the foregoing design constraints. Further, each signal path across the barrier adds to size and expense of the high voltage isolation barrier.

SUMMARY OF THE INVENTION

Briefly, a modem according to the present invention utilizes a DAA having line side circuitry including a telephone network interface and system side circuitry including a host system interface. The line side circuitry and the system side circuitry are separated by a high voltage isolation barrier. In accordance with the invention, the high voltage isolation barrier and other DAA circuitry are configured such that data and control information may be communicated between the system side circuitry and the line side circuitry using a serialized digital communication protocol.

In one embodiment of the invention, the line side circuitry of the modem includes detection and measurement circuitry that is programmable to measure or establish electrical characteristics (e.g., tip/ring voltage and loop current) of the telephone line interface connection. Command information for the programmable circuitry is multiplexed with data communicated across the high voltage isolation barrier.

The serialized digital information communicated across the high voltage isolation barrier in accordance with the invention may also include information for synchronizing communications between the system side circuitry and the line side circuitry, including interrupt and data direction signals. Error correction information may also comprise a portion of the serialized datastream.

A DAA utilizing a serialized digital communication protocol according to the invention permits information relating to many of the DAA functions to be multiplexed into a single path across the high voltage isolation barrier. The DAA may thereby be constructed with a relatively inexpensive and physically compact high voltage isolation barrier.

BRIEF DESCRIPTION OF THE DRAWINGS

A better understanding of the present invention can be obtained when the following detailed description of an exemplary embodiment is considered in conjunction with the following drawings, in which.

DETAILED DESCRIPTION

Figure 1:
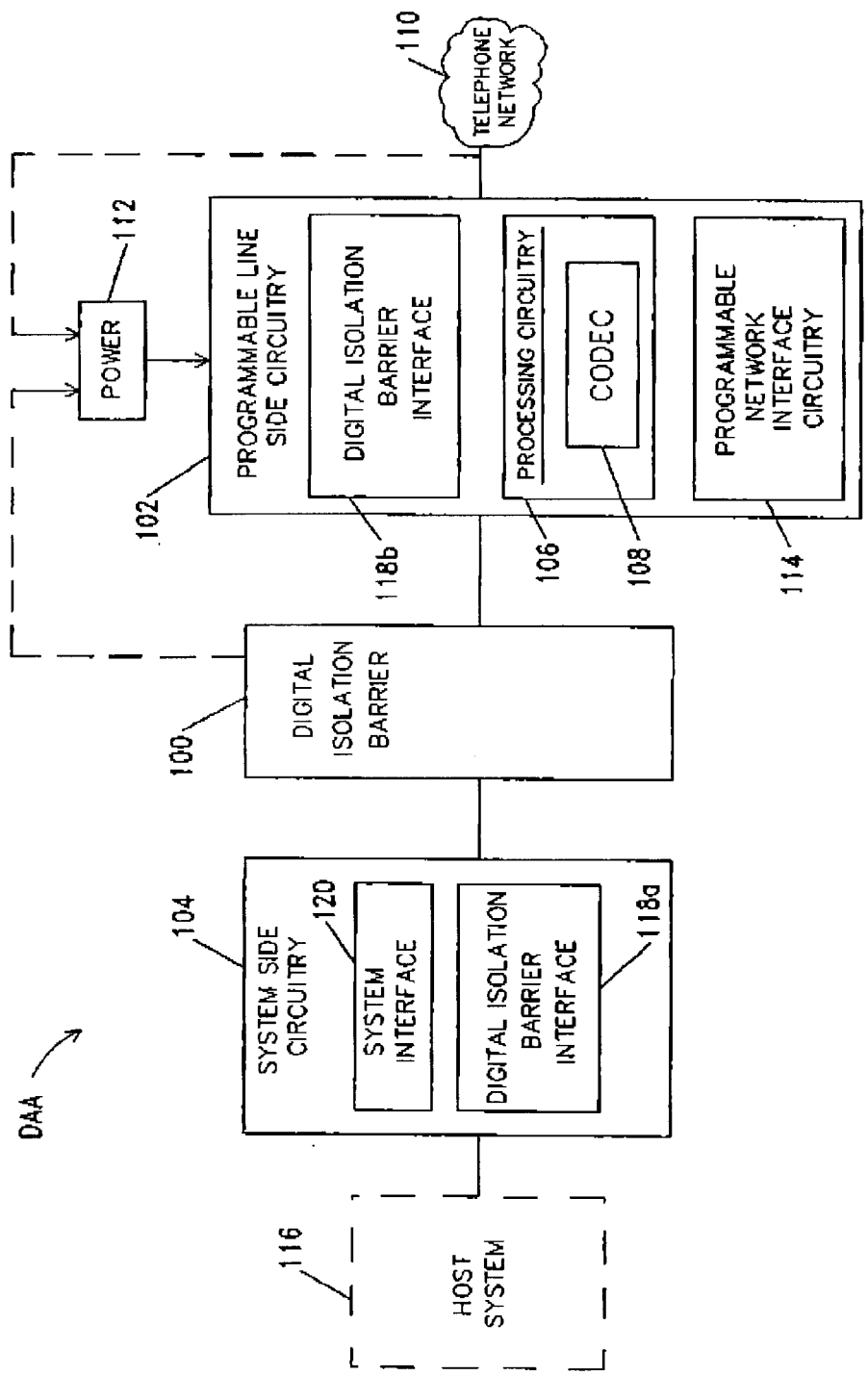
FIG. 1 is a drawing of an exemplary data access arrangement implemented in accordance with the present invention.

FIG. 1 is a schematic block diagram illustrating an exemplary DAA in accordance with the present invention. The DAA of the disclosed embodiment of the invention includes a digital isolation barrier 100 for communicatively coupling programmable line side circuitry 102 to system side circuitry 104. The digital isolation barrier 100, in conjunction with programmable features of the line side circuitry 102 which interface with a telephone network 110, provide the necessary level of electrical isolation between the line side circuitry 102 and the corresponding system side circuitry 104. The digital isolation barrier 100 is designed to be configurable to comply with both U.S. and International requirements for isolation.

The system side circuitry 104 includes a system interface 120 and a digital isolation barrier interface 118a. The system interface 120 coordinates communications with the host system circuitry 116, while the digital isolation barrier interface 118a establishes communications with the digital isolation barrier 100. Data, control and programming signals are all communicated across the digital isolation barrier 100. The bidirectional communication from the system side circuitry 104 and the line side circuitry 102 is accomplished via a digital protocol, examples of which are described below in conjunction with FIGS. 7–9 and Appendix A, which is hereby incorporated by reference and made part of this specification as if set forth in its entirety.

The programmable line side circuitry 102 includes a digital isolation barrier interface 118b corresponding to the digital isolation barrier interface 118a of the system side circuitry 104. The programmable line side circuitry 102 also includes processing circuitry 106 and programmable network interface circuitry 114. Many functions are performed by the programmable network interface circuitry 114, including measuring and establishing electrical parameters that are reflective of the condition of the lines of the telephone network 110.

The processing circuitry 106 of FIG. 1 includes a coder/decoder (CODEC) 108. The CODEC 108 functions to encode the analog signal on the lines of the telephone network 110 into a digital format, and also provides decoded digital signals for analog transmission over the telephone network 110. In a conventional DAA, a CODEC is disposed on the system side of a high voltage isolation barrier. In accordance with the present invention, however, the CODEC 108 is advantageously included on the line side of a digital isolation barrier 100 to facilitate communications with the line side circuitry 102. In addition, placement of the CODEC 108 and other circuitry/functions on the line side reduces the number of signals communicated across the digital isolation barrier 100 and facilitates programmability of the network interface circuitry 114.

Programmability of the network interface circuitry 114 may be achieved in a variety ways. For example, if the host system circuitry 116 desires to program a particular feature of the line side circuitry 102 (e.g., vary line/ring impedance), a command or programming signal is communicated to the system side 104. The command or programming signal may then be reconfigured for transmission to the line side circuitry 102 in a digital manner via the digital isolation barrier 100. Alternatively, the command or programming signal may originate in the system side circuitry 104, or be directed towards the system side circuitry 104 by the line side circuitry 102. Command or programming signals may be multiplexed and serialized for transmission across the digital isolation barrier 100, thereby reducing the complexity and expense of the digital isolation barrier. Data signals may also be combined with the command or programming signals, further simplifying the digital isolation barrier 100.

The line side circuitry 102 of the disclosed embodiment of the invention operates with a "floating" ground reference, and can tolerate high voltage inputs for compatibility with the telephone network 110 and typical surge requirements. The system side circuitry 104 of the disclosed embodiment operates with a fixed digital ground and utilizes standard CMOS logic levels. The system side circuitry 104 shares a common ground and power supply with the host system circuitry 116. The programmable line side circuitry 102 of the disclosed embodiment receives power from either the digital isolation barrier 100 or the telephone network 110 via a power connection 112.

A DAA in accordance with the invention can be utilized with any product that interfaces a telephone network 110 connection to any digital signal processor technology, or any processor of host system circuitry 116 that performs analog modem modulations. Examples include, but are not limited to, data modems, computers, web browsers, set top boxes, fax machines, cordless telephones and telephone answering machines. In addition, many different interfaces with the telephone network 110 and/or other transmission media are contemplated, such that the DAA may be configured to be compatible with whichever means is utilized.

Figure 2:
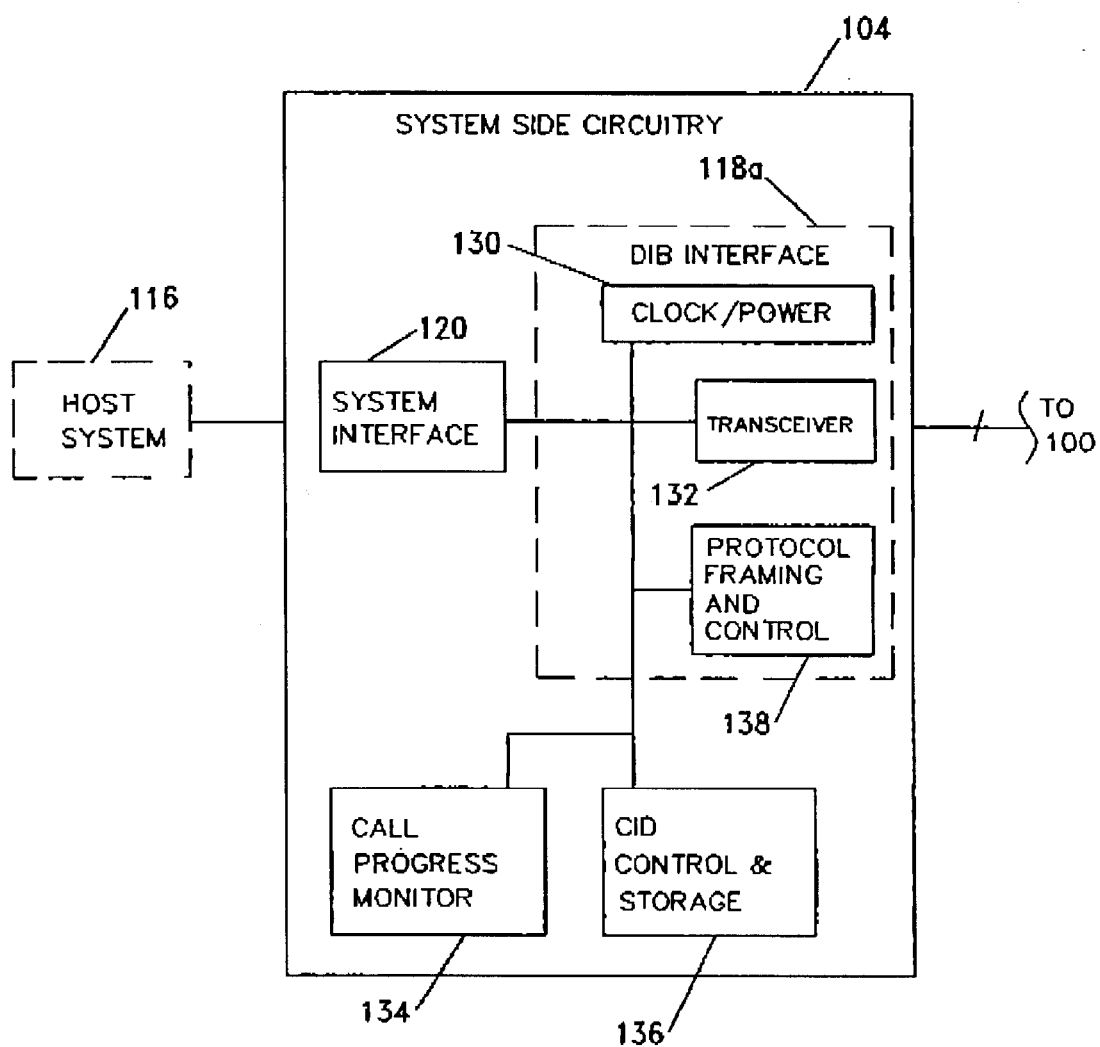
FIG. 2 is a drawing illustrating an exemplary embodiment of the system side circuitry of the data access arrangement of FIG. 1.

FIG. 2 is a drawing illustrating an exemplary embodiment of the system side circuitry of the data access arrangement of FIG. 1. The digital isolation barrier interface 118a of the disclosed embodiment includes clock/power driver circuitry 130, as well as protocol framing and control circuitry 138 and a transceiver 132, which coordinate bidirectional transfer of data, control and programming signals across the digital isolation barrier 100.

The clock and power driver circuitry 130 is responsible for transferring power and clock signals across the digital isolation barrier 100 to the line side circuitry 102 via the digital isolation barrier 100. The clock and power driver circuitry 130 is programmable by the system side circuitry 102 to include a number of power states, including: an off-hook, high power mode in which line side circuitry 102 is powered by the system side circuitry 104; an off-hook, low power mode in which the line side circuitry 102 is powered by the telephone network 110 and/or the system side circuitry 104; and on-hook, low power mode in which the line side circuitry 102 is waiting for a ring or a caller ID signal; and an on-hook, disabled state in which the line side circuitry 102 is not receiving power. The clock and power driver circuitry provides several different drive current levels as needed for different operating/power consumption modes of the line side circuitry 102. As noted, certain embodiments or power modes of the line side circuitry 102 may not require power from the clock and power driver circuitry 130.

The digital isolation barrier interface 118a also includes a protocol framing and control circuit 138, which functions to organize the data transmitted by the transceiver 132. The protocol framing control circuit 138 also deconstructs signals received by the transceiver 132 from the line side circuitry 102.

Inputs to the system interface circuit 120 include inputs for off-hook signal(s), caller ID number information, international control signals, and reserved signals for upgrades. Outputs of the system interface circuit 120 include but are not limited to a line side off-hook signal, an extension off-hook signal, a remote unhook signal, a digital PBX signal, a ring indication signal, and a wake signal. General-purpose I/O inputs are also provided.

Numerous alternative implementations for the communication lines between the host system circuitry and the system interface circuit 120 are contemplated. For example, the system interface circuit 120 may be configured to interface directly with a controllerless host architecture. A high-speed serial data interface or a parallel data interface with various I/O lines for modem control and DAA status may also be used. Likewise, the call progress monitor 134 and the CID control and storage circuitry 136 may be included in the host system circuitry 116 or in the line side circuitry 102, and the transceiver circuitry 132 and 186 may provide for serial communications, parallel communications, or a combination thereof.

The system side circuitry 108 also includes a call progress monitor 134 and a caller ID (CID) control and storage circuit 136. The call progress monitor 134 is configured to analyze raw signal samples from the CODEC 108 and drive a buzzer or speaker (not shown). The call progress monitor 134 of the disclosed embodiment is also programmable to provide a variety of audio levels.

The CID control and storage circuit 136 is preferably configurable to support all known worldwide caller ID schemes. This includes, but is not limited to, the United States and North America, Japan, Western Europe (including the United Kingdom) and France. Accordingly, the CID control and storage circuit 136 supports both caller ID information occurring between rings (United States) and after a tip/ring reversal (United Kingdom, Japan). The CID control and storage circuit 136 also provides memory (not separately illustrated) for storing a digital representation of caller ID information received from the digital interface barrier 100. Caller ID data is decoded before storage in the memory, although storage of raw information is acceptable. The CID control and storage circuitry 136 of the disclosed embodiment is programmable to be disabled by the host system circuitry 116 or other portions of the DAA.

Figure 3A:
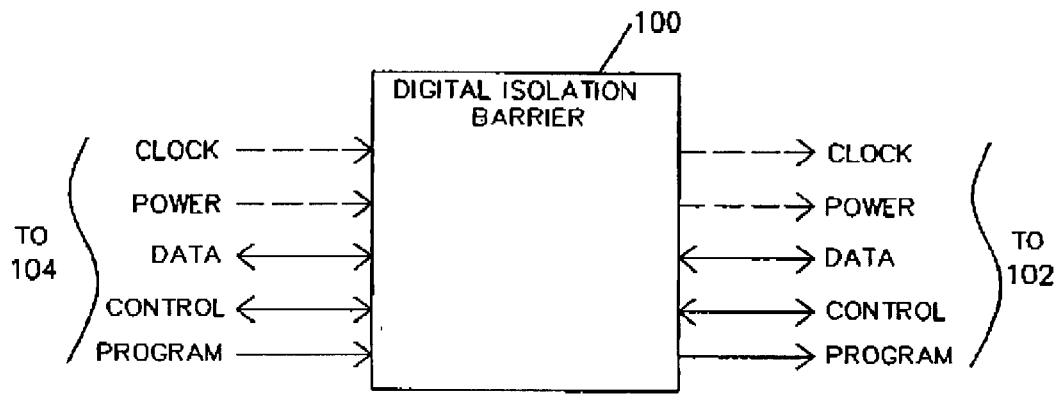
FIGS. 3A–3E are drawings providing alternate embodiments of a digital isolation barrier according to the present invention.

FIGS. 3A–3E depict exemplary alternate embodiments of a digital isolation barrier 100 implemented in accordance with the present invention. Referring first to FIG. 3A, a number of signals may be communicated between the line side circuitry 102 and the system side circuitry 104. As noted above, a clock signal may be passed from the system side circuitry 104 to the line side circuitry 102 in order to facilitate synchronization of serial communications. In addition, the line side circuitry 102 may be powered completely or in part by a power signal communicated across the digital isolation barrier 100. Further, serial data, control and/or program signals are also communicated across the digital isolation barrier 100. As discussed immediately below, a variety of electrical configurations for transferring these signals across the digital isolation barrier are possible.

Figure 3B:
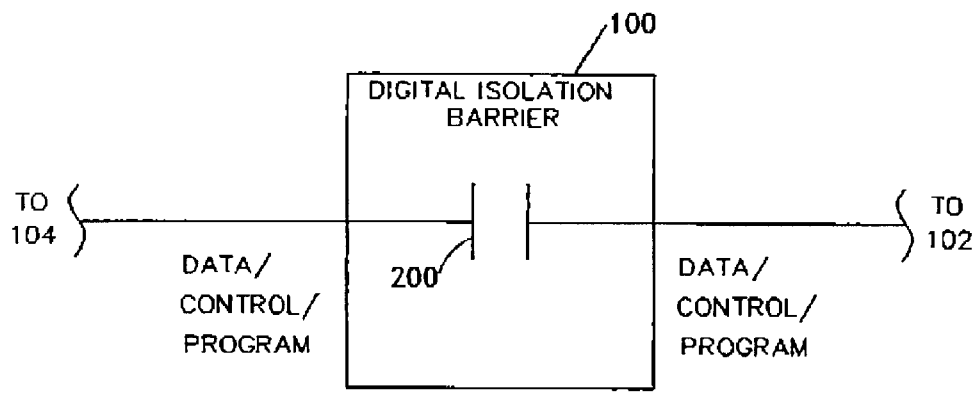

FIG. 3B depicts an embodiment of the digital isolation barrier 100 in which the serial datastream is communicated across a signal path employing a single capacitor 200. In this embodiment, the transceiver circuitry 132 and 186 of the system side circuitry 104 and the line side circuitry 102, respectively, are configured to communicate a single-ended pulse train across the capacitor 200.

Figure 3C:
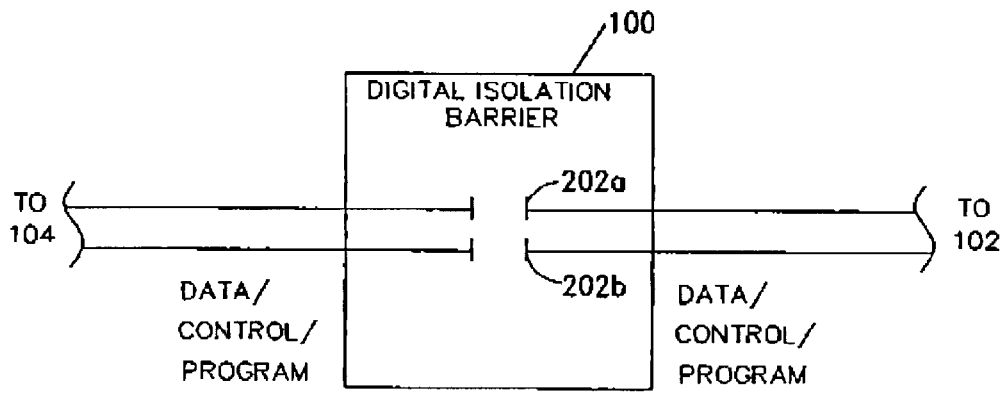

FIG. 3C depicts an embodiment of the digital isolation barrier 100 in which the single capacitor configuration is replaced by a differential configuration involving capacitors 202a and 202b. In this embodiment, the serial datastream consisting of data, control and/or programming signals is organized in the same manner as if the interface of FIG. 3B were utilized. However, the transceiver circuitry 132 and 186 is configured for differential communications when utilized with the digital isolation barrier of FIG. 3C. One example of such a configuration is discussed below in conjunction with FIG. 5.

Figure 3D:
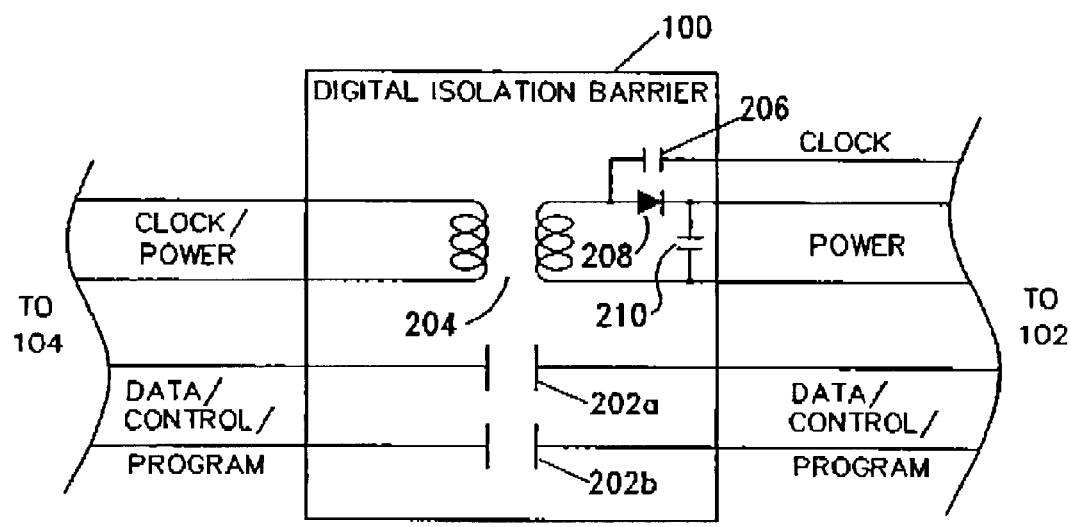

FIG. 3D illustrates another contemplated embodiment for the digital isolation barrier 100. In this embodiment, a transformer 204 is added to the circuitry of FIG. 3C to communicate clock and power signals from the system side circuitry 104 to the line side circuitry 102. More specifically, the primary side of the transformer 204 is driven by the system side circuitry 104 such that clock and power signals of sufficient strength can be derived from the secondary side of the transformer 204. The clock signal, if provided, is coupled to the line side circuitry 102 via a relatively small value capacitor 206. The power connections of the line side circuitry 102 are coupled to the secondary side of the transformer 204 via a half wave rectifier comprising a voltage regulating diode 208 and a charge storage capacitor 210. The capacitor 210 is provided across the power and ground connections of the line side circuitry 102 to provide a stable power supply voltage.

Although the disclosed embodiment of FIG. 3D employs a half wave rectifier, a full wave rectifier or a bridge rectifier could also be utilized. In another contemplated embodiment, clock and power signals are communicated across the digital interface barrier 100 via a separate pair of capacitors (not shown).

Figure 3E:
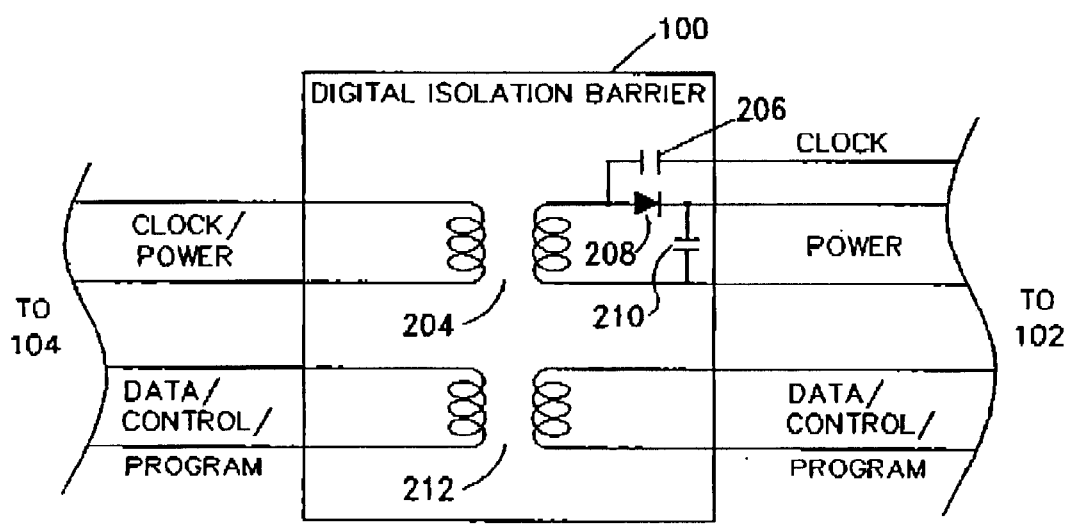

FIG. 3E illutrates another alternate embodiment of the digital isolation barrier 100. In this embodiment, an isolation transformer 212 replaces the isolation capacitors 202a and 202b. Data, control and programming signals are communicated between the system side circuitry 104 and the line side circuitry 102 utilizing the same serial data protocol of the other embodiments. Although not separately illustrated, other types of circuitry (such as opto-couplers and thermal relay circuitry) may be used to effect a digital isolation barrier 100 in accordance with the present invention.

Figure 4A:
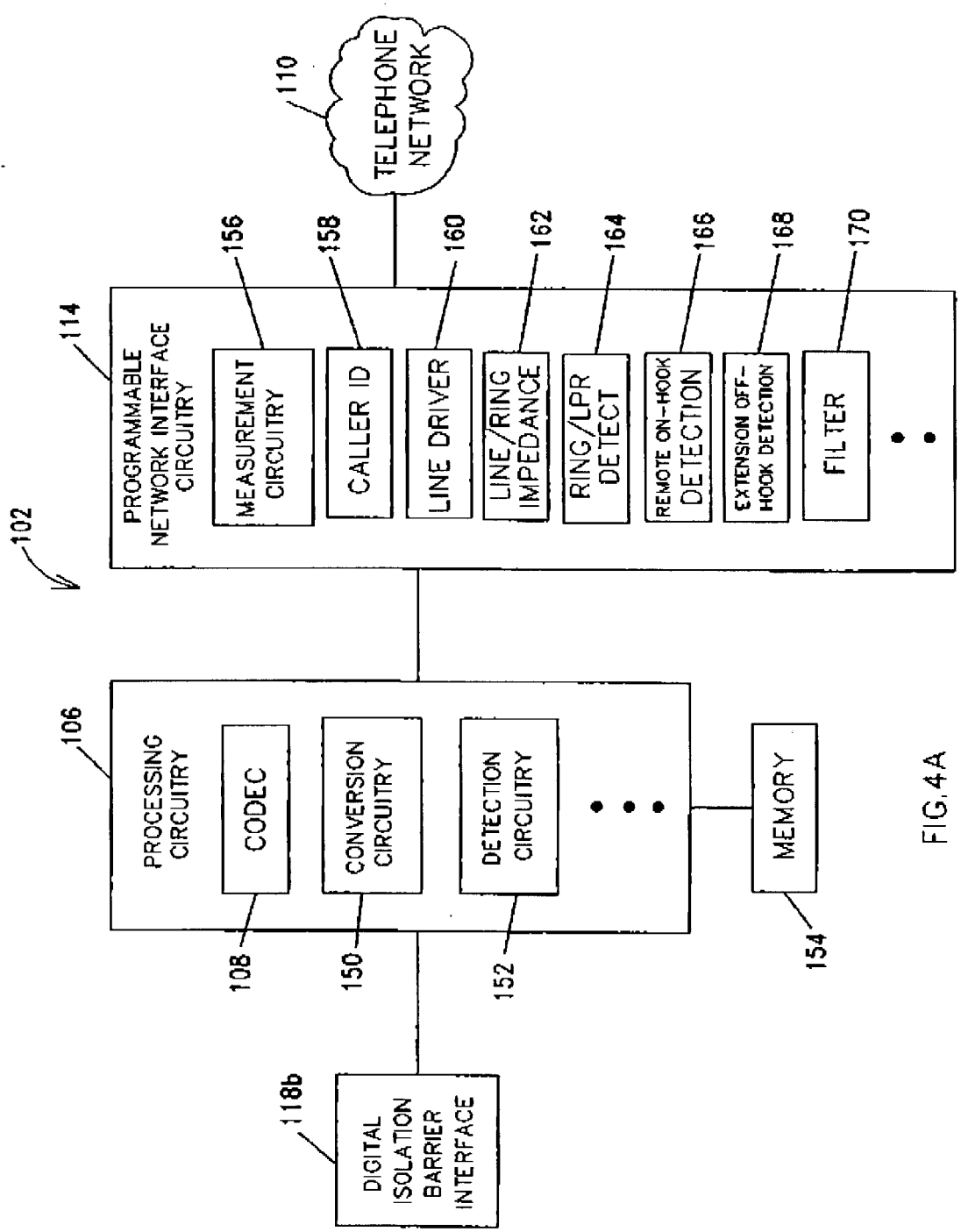
FIGS. 4A and 4B are drawings providing exemplary details of the line side circuitry of the data access arrangement of FIG. 1.

FIG. 4A is a drawing providing exemplary details of an embodiment of the line side circuitry of the data access arrangement of FIG. 1. As described above, the line side circuitry 102 is isolated from the rest of the DAA by the digital isolation barrier interface 118b and the digital isolation barrier 100 in order to comply with applicable regulatory requirements.

The line side circuitry 102 of FIG. 4A includes processing circuitry 106 and programmable network interface circuitry 114. The processing circuitry 106 of the disclosed embodiment is comprised of a CODEC 108, conversion circuitry 150 and detection circuitry 152. A memory 154 is also provided for use by the processing circuitry 106. Various components of the processing circuitry 106 may be configurable by the system side circuitry 104, or pre-programmed by code stored in the memory 154. It is further contemplated that the memory 154 may store electrical specifications and configurations relating to the regulatory requirements of various countries.

The CODEC 108 of the disclosed embodiment of the invention is a 16 bit, 16 KHz a second order sigma-delta CODEC used for sampling analog signals on the telephone network 110, and to provide such signals to the telephone network 110. The conversion circuitry 150 includes an analog-to-digital converter (ADC) and a digital-to-analog converter (DAC) for supporting various functionality of the programmable network interface circuitry 114. The detection circuitry 152 may serve a variety of functions, including monitoring of the programmable network interface circuitry 114 for significant changes in the status of the telephone network 110, as well as monitoring and execution of commands from the system side circuitry 104.

The programmable network interface circuitry 114 includes a wide variety of programmable functions. For example, programmable measurement circuitry 156 is provided with adjustable parameters for measuring tip/ring voltage and loop current conditions on the lines of the telephone network 110.

The caller ID circuit 158 receives and decodes caller identification information from the telephone network 110. To this end, it includes a relatively simple ADC and a demodulator complying with one or more standards (e.g., V.23/Bell 202, ETSI 300). It is also capable of transferring caller identification information across the digital isolation barrier 100 in a low power or D3cold state, and is programmable to provide caller ID information without a ring or line polarity reversal.

Signals are provided by the DAA to the telephone network 110 via line driver circuitry 160. The line driver circuitry 160 of the disclosed embodiment is programmable to drive signals having the electrical characteristics prescribed by the country in which the DAA is being used. Programmable line/ring impedance circuitry 162 is also provided to allow the DAA or host system circuitry 116 to program the electrical characteristics of the DAA as seen by the telephone network 110 to facilitate compliance with a variety of regulatory standards, including country-by-country ring loading. Values measured by the measurement circuitry 156 may be used in this process. In addition, the programmable line/ring impedance matching circuitry 162 of the disclosed embodiment includes support for metering filters.

The ring/line polarity reversal (LPR) detection circuitry 164 of the disclosed embodiment is likewise programmable to comply with both U.S. and international requirements. The ring/LPR detection circuitry 164 functions to provide ring and ring wake bit signals. In addition, the ring/LPR detection circuitry 164 is configurable to provide line current sensing information for use by remote on-hook detection circuitry 166, extension off-hook detection circuitry 168 and digital PBX functions.

Other contemplated components of the programmable network interface circuitry 114 include, for example: filtering circuitry 170, pulse dialing circuitry, hook switch circuitry, general purpose I/O lines, line current sensing for digital PBX detection, measurement circuitry for determining Central Office battery and loop DC resistance, line in use indicators, PABX digital line detection circuitry, and host controlled worldwide DC masks. Many of the disclosed features allow the host system circuitry 116 to easily ascertain the condition of the telephone network 110. The line side circuitry 102 further includes a hard coded key (or sequence of keys) that can be used by software executed by a microcontroller or by digital signal processing circuitry (not separately illustrated) to enable itself.

Figure 4B:
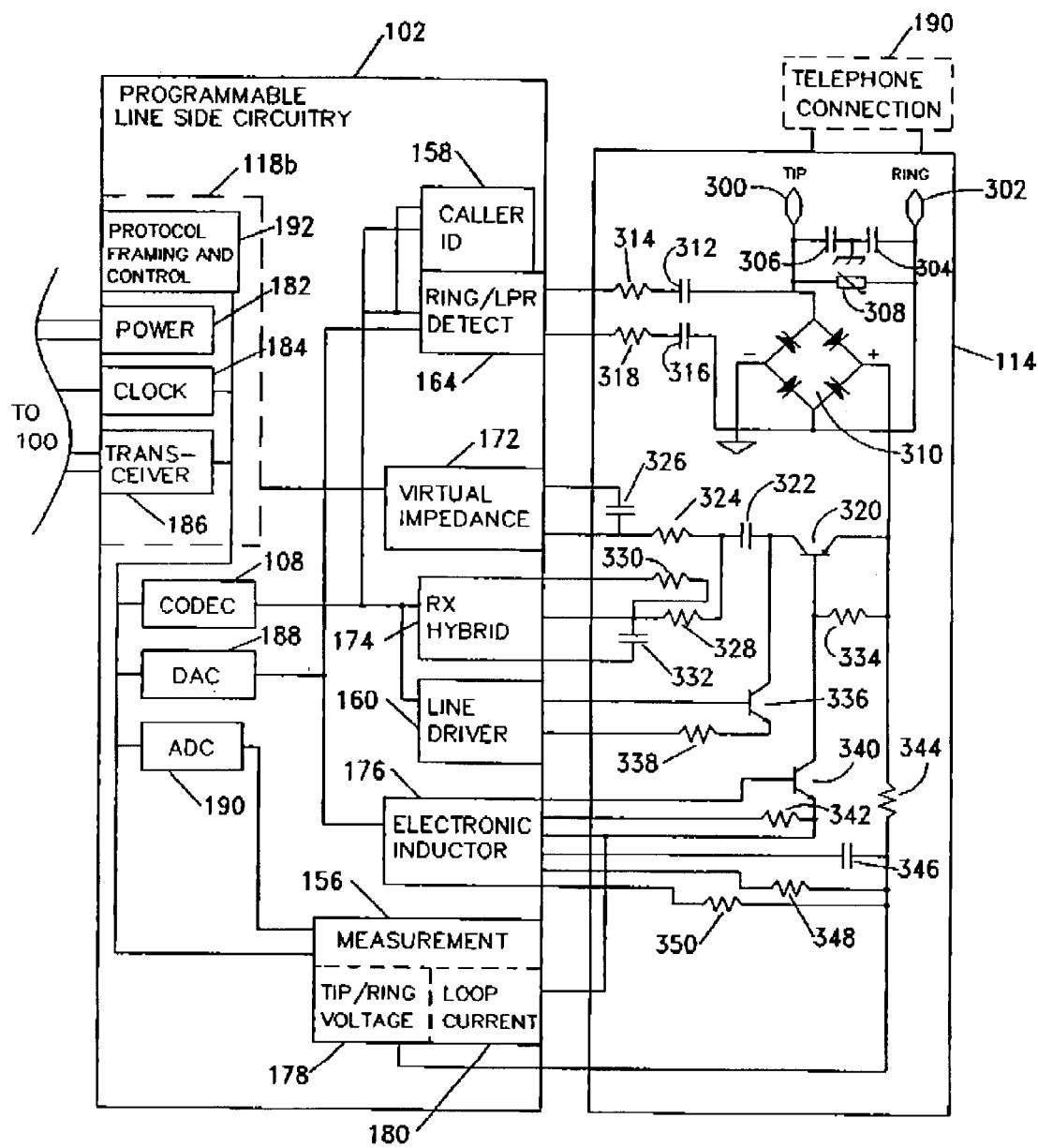

FIG. 4B is a drawing providing exemplary details of an another embodiment of the line side circuitry of the data access arrangement of FIG. 1. The digital isolation barrier interface 118b of this embodiment includes a protocol framing and control circuit 192 that functions to organize the data transmitted by the transceiver 186. The protocol framing circuit 192 also deconstructs signals received by the transceiver 186 from the system side circuitry 104. In addition, an optional power regulation circuit 182 is provided if the line side circuitry 102 receives power from the system side circuitry 104. Likewise, a clock circuit 184 is provided in the digital isolation barrier interface 118b to receive a signal from the system side circuitry 104 for use in generating clock signals for the logic of the programmable line side circuitry 102. Further details of the operation of an exemplary power regulation circuit 182 and an exemplary clock circuit 184 may be found in previously incorporated U.S. patent application Ser. No. 09/088,629, filed Jun. 2, 1998, and U.S. patent application Ser. No. 09/161,209, filed Sep. 25, 1998.

In addition to the CODEC 108, a DAC 188 and an ADC 190 are also provided. The DAC 188 and ADC 190 may operate as part of the CODEC 108, or may be separate circuits for use by other components of the line side circuitry 102. For example, the DAC 188 of the disclosed embodiment is utilized by a ring/LPR detection circuitry 164 and an electronic inductor 176. Similarly, the ADC 190 operates in conjunction with the measurement circuitry 156, which includes tip/ring voltage measurement circuit 178 and loop current measurement circuitry 180.

A hybrid circuit 174 is coupled to the CODEC 108 for performing two wire to four wire conversion functions and to provide incoming signals to the CODEC 108. A line driver circuit 160 is also coupled to the CODEC 108 and other analog circuitry of the programmable network interface 114. The line driver provides signals from the CODEC 108 to the tip 300 and ring 302 conductors of the telephone connection 190.

The analog circuitry of the programmable network interface 114 includes electromagnetic interference (EMI) suppression capacitors 306 and 304 coupled between the tip connection 300 and ring connection 302, respectively, of the telephone connection 190. In addition, a metal oxide varistor 308 is coupled between the tip connection 300 and ring connection 302 to provide lightning and surge protection. It is contemplated that the metal oxide varistor 308 could be replaced by a sidactor or similar circuit.

A full wave rectifier 310 is also coupled between the tip connection 300 and ring connection 302. As known to those skilled in the art, the full wave rectifier 310 ensures that the fsame polarity of DC signal is present at its "+" terminal regardless of the DC polarity of the tip and ring connections 300 and 302. In addition, a capacitor 312 and resistor 314 are coupled in series between the tip connection 300 and the ring/LPR detection circuitry 164. Similarly, a capacitor 316 and resistor 318 are coupled between the ring connection 302 and the ring/LPR detection circuitry 164. These connections provide differential inputs to the ring/LPR detect circuitry 164.

The emitter of a bipolar junction transistor 320 is coupled to the "+" terminal of the full wave bridge rectifier 310, while its collector is coupled to a capacitor 322 and a transistor 336. The transistor 320, in conjunction with a resistor 334 coupled between its emitter and base, functions to isolate the virtual impedance circuit 172 and the hybrid circuit 174 from the telephone connection 190 when in an on-hook condition. The virtual impedance circuit 172 is coupled to the capacitor 322 via a capacitor 326 and resistor 324, while the hybrid circuit 174 is coupled to the capacitor 322 via resistors 328 and 330 and a capacitor 332. In the disclosed embodiment, these resistors and capacitors provide signal gain/conditioning to allow the virtual impedance circuit 172 and hybrid circuit 174 to operate at a variety of tip/ring voltage levels. The transistor 320 and the resistor 334 are not required in certain contemplated applications.

The transistor 336 and resistor 338, which are coupled to the line driver circuit 160, allow the line side circuitry 102 to provide signals to the tip and ring connections 300 and 302 via the full wave bridge rectifier 310. More specifically, modulation of the base-collector voltage of the transistor 336 allows an AC signal to be presented on the tip and ring connections 300 and 302.

A transistor 340 having a collector coupled to the base of the transistor 320, in conjunction with the transistor 342, draw line current from the telephone connection 190 for provision to the electronic inductor 176 to indicate off-hook conditions. The electronic inductor 176 operates in conjunction with the DAC 188, ADC 190 and software control functionality of the DAA. The electronic inductor 176 is also coupled to the "+" terminal of the full wave bridge rectifier 310 via resistors 344, 348, 350 and capacitor 346. The resistor dividers formed of resistors 344 and 348 are utilized to determine if the tip and ring connection 300 and 302 voltages reflect an on-hook condition.

The loop current measurement circuitry 180 is also coupled to the emitter of the transistor 340 in order to measure current levels present on the tip and ring conductors 300 and 302. The tip/ring voltage measurement circuit 178 is coupled to the "+" terminal of the full wave bridge rectifier 310 via the resistor 344.

The DAC 188 and ADC 190 are utilized in the disclosed embodiment to aid in measuring currents and voltages in the tip and ring connections 300 and 302, and for providing related information to the protocol framing and control circuit 192 for provision to the system side circuitry 104. The DAC 188 and ADC 190 are programmable to allow modifications to the current and voltages on the tip and ring connections 303 and 302 (e.g., the line side circuitry 102 can be programmed to draw more current from the tip and ring connections 300 and 302 to lower telephone line voltages as may be required in a specific country).

As with the embodiment of FIG. 4A, the line side circuitry 102 of FIG. 4B may include various other combinations of programmable features. In addition, further exemplary details of specific portions of the programmable line side circuitry 102 of FIGS. 4A and 4B can be found in the references incorporated above, including: U.S. patent application Ser. No. 09/074,896, filed May 8, 1998; U.S. patent application Ser. No. 09/075,451, filed May 8, 1998; and U.S. patent application Ser. No. 09/929,960, filed Sep. 15, 1997.

Figure 5:
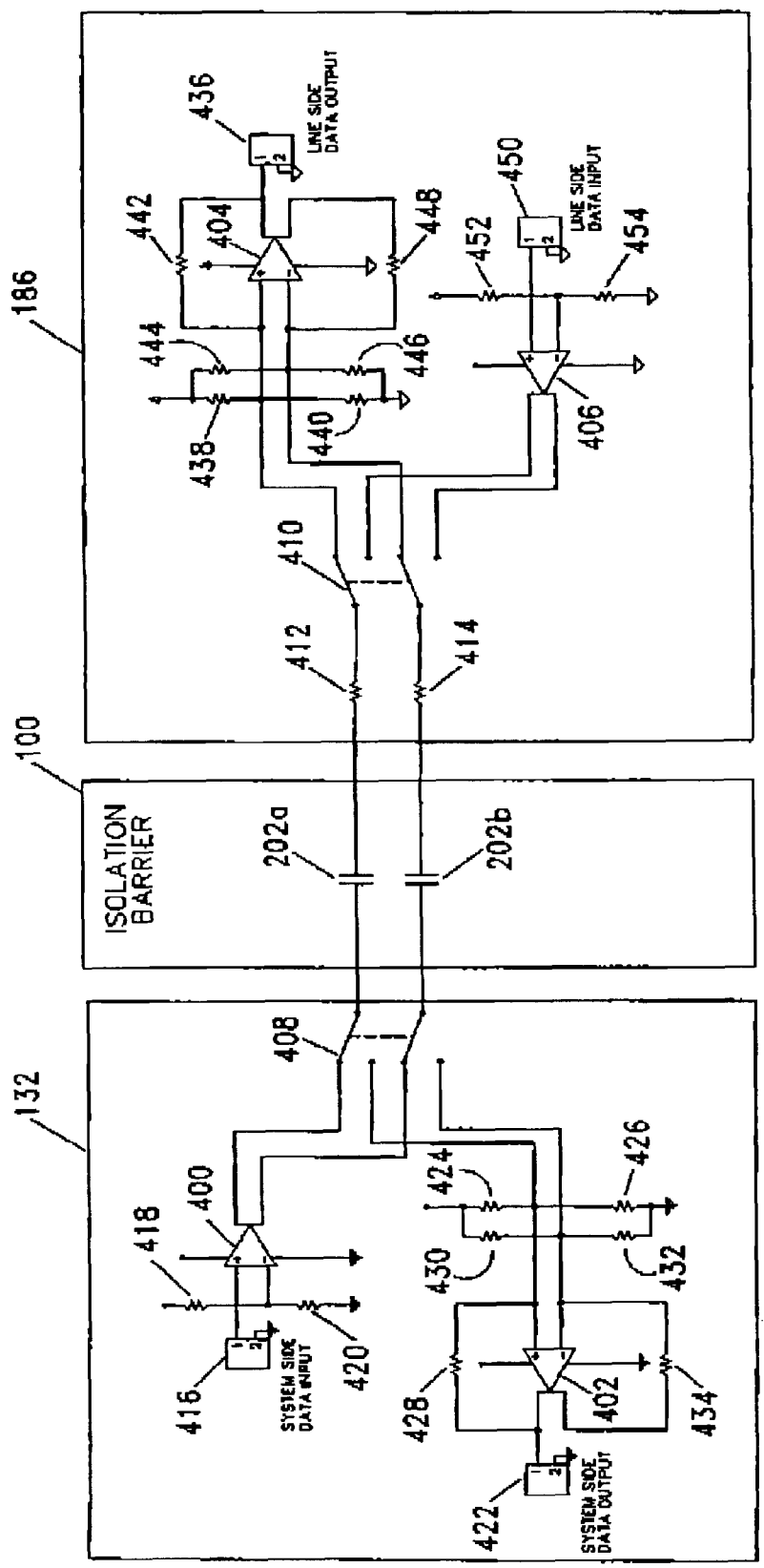
FIG. 5 is a drawing of exemplary transceiver circuitry according to the present invention for communicating a serial datastream across the digital isolation barrier of FIG. 1.

FIG. 5 is a drawing of exemplary transceiver circuitry 132 and 186 for communicating a serial datastream across the digital isolation barrier 100 of FIG. 1. The disclosed circuitry provides for bidirectional serial communications across the digital isolation barrier 100 in a differential manner. To this end, each of the transceivers 132 and 186 comprise switchable line driver circuitry.

Referring more specifically to transceiver 132, a first differential output comparator 400 is provided for driving signals across the digital isolation barrier 100, while a second comparator 402 is provided for receiving signals from the digital isolation barrier 100. An integrated double-pole double-throw switch 408 is provided to couple either the outputs of the comparator 400 or the inputs of the comparator 402 to the digital isolation barrier 100. Operation of the switch 408 is coordinated with the operation of an integrated double-pole double-throw switch 410 of the transceiver circuit 186.

Data to be transmitted by the system side circuitry 104 is provided to the non-inverting input of the comparator 400 via a connection 416. Resistors 418 and 420 are coupled in series between system side power and ground to provide a reference voltage (at the common node) to the inverting input of the comparator 400. The reference voltage is determined by the ratio of the resistors 418 and 420, and is set to one half of the power supply voltage or other suitable voltage level.

When the transceiver circuitry 132 is receiving data from the digital isolation barrier 100, the signals provided to the input of the comparator 402 of the disclosed embodiment require DC voltage reference levels for the incoming AC signals. To this end, the non-inverting input of the comparator 402 is coupled to the common node of a resistor divider formed by resistors 424 and 426. Similarly, the inverting input of the comparator 402 is coupled to the common node of a resistor divider network formed by resistors 430 and 432. A system side data output connection 422 is coupled to one output of the comparator 402. A feedback resistor 428 is coupled between this output and the non-inverting input of the op-amp 402 to provide hysterisis for purposes of noise immunity. Similarly, a feedback resistor 434 is coupled between the other output of the comparator 402 and its inverting input.

Current limiting resistors 412 and 414 are coupled between the digital isolation barrier 100 and the poles of the double-pole double-throw switch 410 of the transceiver circuit 186. Differential output comparators 404 and 406 are configured to receive and transmit signals, respectively, in the same manner as the comparators 400 and 402. More specifically, the outputs of the differential output comparator 406 are coupled to a paired side of the switch 410 in order to transmit data signals. The inverting input of the comparator 406 is provided a reference voltage by a voltage divider formed of series connected resistors 452 and 454. The non-inverting input of comparator 406 is coupled to a line side data input connection 450, and receives the input to be provided across the digital isolation barrier 100.

The comparator 404 is configured to provide data to a line side data output connection 436 when the switch 410 is configured as illustrated. Accordingly, the inputs of the comparator 404 are coupled to a paired side of the double-pole double-throw switch 410. A DC bias voltage is established at the non-inverting input of the comparator 404 by a voltage divider formed of resistors 438 and 440. Similarly, a DC bias voltage is provided to the inverting input of the comparator 404 by a resistor divider formed of resistors 444 and 446. A feedback resistor 442 is coupled between one output of the comparator 404 and its non-inverting input to provide hysterisis. Likewise, a feedback resistor 448 is coupled between the opposing output of the comparator 404 and its inverting input.

Control of the double-pole double-throw switches 408 and 410 is synchronized by protocol framing and control circuitry 138 and 192, respectively, as discussed below in conjunction with FIGS. 7–9. Many different transceiver circuit arrangements are possible for driving differential signals across the digital isolation barrier 100, and it is not intended that this embodiment of the invention be limited to any one particular arrangement.

Figure 6:
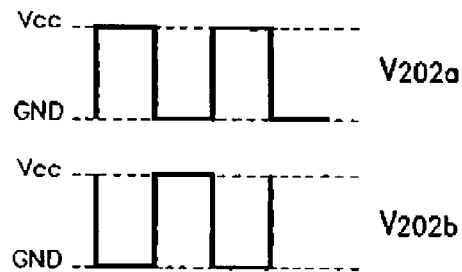
FIG. 6 is a voltage waveform drawing illustrating differential communications across the digital isolation barrier of FIG. 5.

FIG. 6 provides exemplary voltage waveforms depicting the differential voltages across the digital isolation barrier of FIG. 5. More specifically, a first $V_{202a}$ is shown for a typical voltage across the isolation capacitor 202a, while a second $V_{202b}$ is shown for the corresponding differential waveform across the isolation capacitor 202b. As illustrated, one of the voltages is at a logic high level while the corresponding voltage is at a logic low level. As will be appreciated by those skilled in the art, utilizing differential voltages across the isolation barrier 100 may improve signal integrity, although single-ended arrangements are also contemplated.

Figure 7:
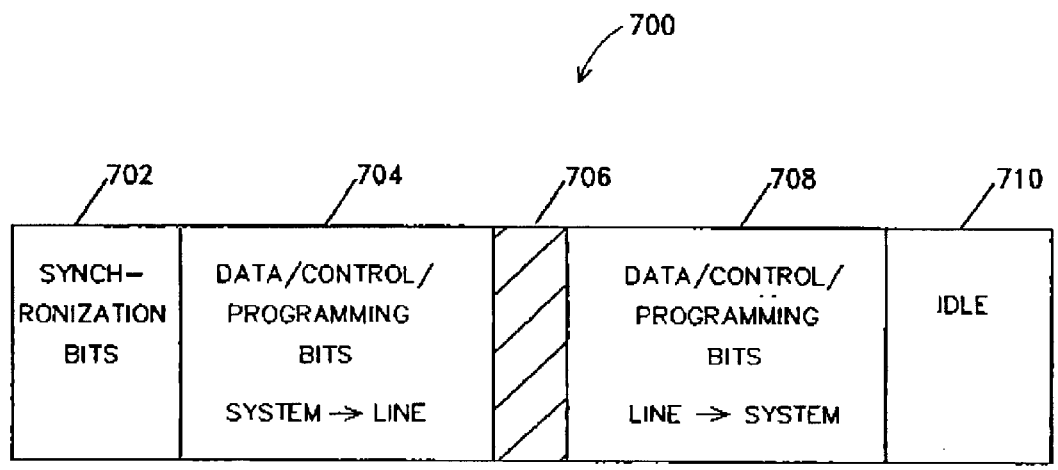
FIG. 7 is an illustration of an exemplary serial protocol according to the present invention for communicating information across the digital isolation barrier of FIG. 1.

FIG. 7 is a diagram of an exemplary serial frame protocol for communicating information across the digital isolation barrier 100 of FIG. 1 in accordance with the present invention. Because the digital isolation barrier 100 is composed of devices such as capacitors or transformers, communications are achieved via AC waveforms. Therefore, in the disclosed embodiment, it is desirable to use an encoding scheme that eliminates long sequences of zeros or ones in the data.

The serial protocol provides sufficient bandwidth to accommodate data from the CODEC 108, CODEC 108 control, data and status signals, line side circuitry 102 control inputs, line side circuitry 102 status outputs, as well as a number of general purpose input/output signals. It is also contemplated that errors (such as those due to voltage surges) may be accounted for by error correction techniques. One method of detecting such errors is to include redundancy in the transmitting data, such as providing a separate, redundant data packet for each data packet that is transmitted.

The exemplary serial frame 700 of FIG. 3 is composed of a number of components or bit groupings. Specifically, frame synchronization bits 702 are provided to coordinate communications between the system side circuitry 104 and the line side circuitry 102. In the enclosed embodiment of the invention, these frame synchronization bits 702 are provided by the system side circuitry 104, although other configurations are possible. Following the frame synchronization bits 702, data, control and/or programming bits are transmitted across the digital isolation barrier 100 to the line side circuitry 102. In the disclosed embodiment of the invention, in which bidirectional serial communications across the digital isolation barrier 100 are utilized, a number of reversal bits 706 are provided in order to allow sufficient time for the transceiver circuitry 132 and 186 to switch direction. The number of bits required depends on the switching time of the particular transceiver circuitry that is utilized by the DAA. A specific reversal synchronization pattern may be utilized to initiate reversal of the transceiver circuitry.

Next, data, control and/or programming bits are communicated in a serial manner from the line side circuitry 102 to the system side circuitry 104. Idle bits 710 are also provided in the serial frame 700 to provide extra bandwidth (in a predefined frame size) for addition of other capabilities and information.

The data, control and/or programming bits may also include interrupt-type information for use in communicating status changes and/or synchronization. For example, in the disclosed embodiment the system side circuitry 104 responds to all interrupt events received over the digital isolation barrier 100. The system side circuitry 104 uses an interrupt mask register (not illustrated) to determine if interrupt events should be relayed to the host system circuitry 116. In the disclosed embodiment, the circuits which are able to interrupt the system side circuitry 104 are the caller ID circuit 158 and the ring/LPR detection circuitry 164. Any activity from these circuits should be detected to allow the system side circuitry 104 to wake up (at least partially) and validate ring and/or caller ID data.

One contemplated encoding protocol involves transmitting data across the digital isolation barrier 100 at half of the clock rate. In this scheme, a "0" is coded as a logic level low to a logic level high transition, while a "1" is coded as a transition from a logic level high to a logic level low transition. For example, if a 4 MHz clock is provided to the line side circuitry 102, a 2 MHz signal derived from the clock signal may be used as a bit clock for serial communications. Using this arrangement, 128 bits are available in serial form during one period of a 16 kHz sample rate with a 2.048 MHz clock (128=4.096 MHz/(2*16 kHz)). It is contemplated that control data may flow at either a lower or higher rate than data from the CODEC 108.

A specific embodiment of a protocol for digital serial communications across the digital interface barrier 100 is provided in attached Appendix A. The protocol disclosed therein is exemplary in nature, and those skilled in the art will recognize that numerous variations are possible.

Figure 8:
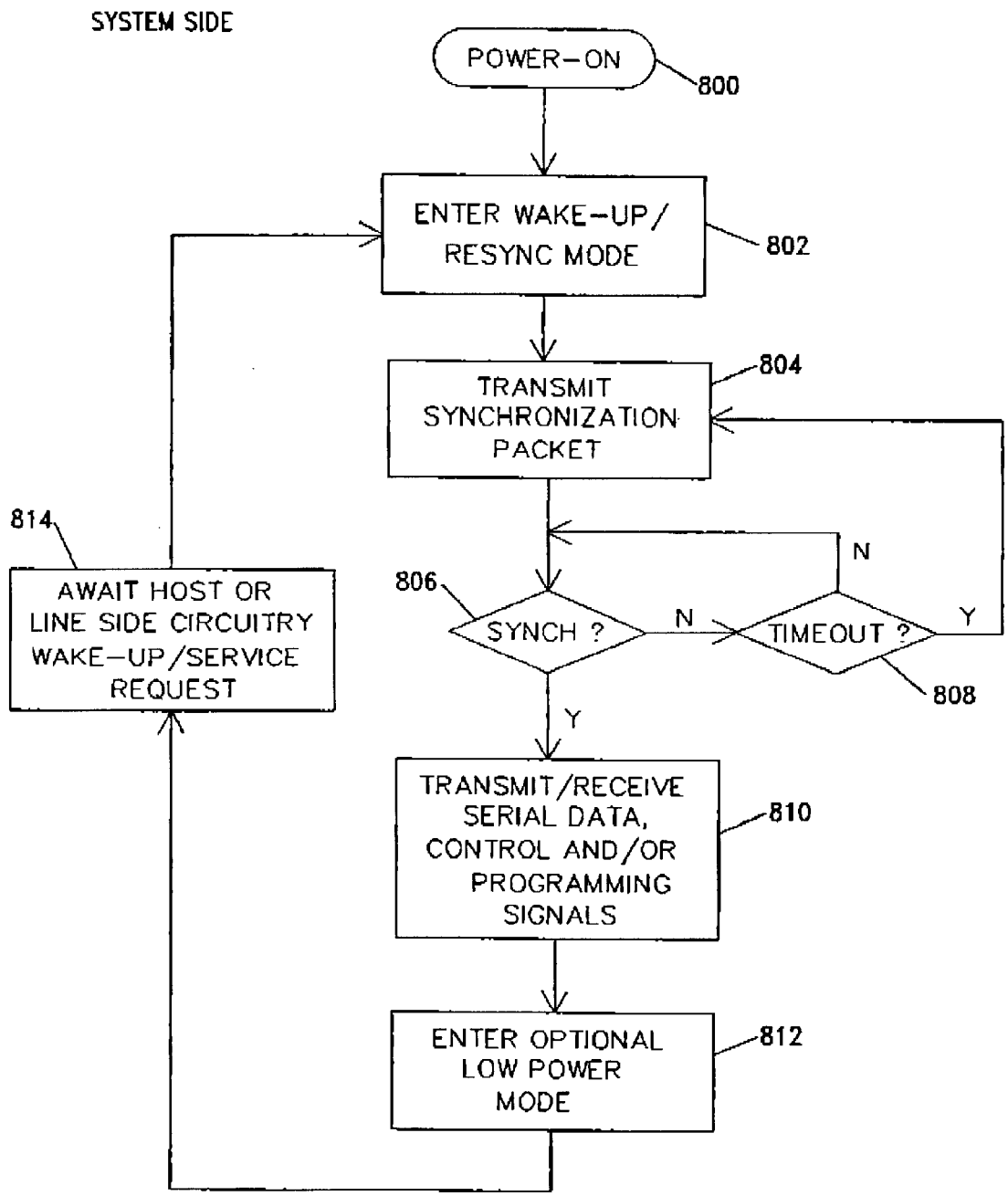
FIG. 8 is a flow chart depicting exemplary serial communication steps, performed by the system side circuitry of FIG. 1, according to the present invention.

FIG. 8 is a flow chart of exemplary serial communication steps performed in accordance with the present invention by one embodiment of the system side circuitry 104 of FIG. 1. Following application of power in step 800, the system side circuitry 104 enters a wake-up or resynchronization mode in step 802. Next, in step 804, the transceiver 132 transmits a synchronization packet. The system side circuitry 104 then awaits signals from the line side circuitry 102 indicating that synchronization has been achieved. If synchronization has not been achieved as determined in step 806, a counter is examined in step 808 to determine if a predetermined time-out value has been reached. If not, the process returns to step 806. If the time-out value has been surpassed, the process returns to step 804 where an additional synchronization packet is transmitted.

If synchronization has been achieved as determined in step 806, the process continues to step 810 where serial data, control and/or programming signals are transmitted or received by the transceiver 132. Following completion of the serial communications, an optional low power mode is entered in step 812. Next, in step 814, the system side circuitry 104 awaits a wake-up signal or service request from either the host system circuitry 116 or the line side circuitry 102. Once such signal is received, the process returns to step 802.

Figure 9:
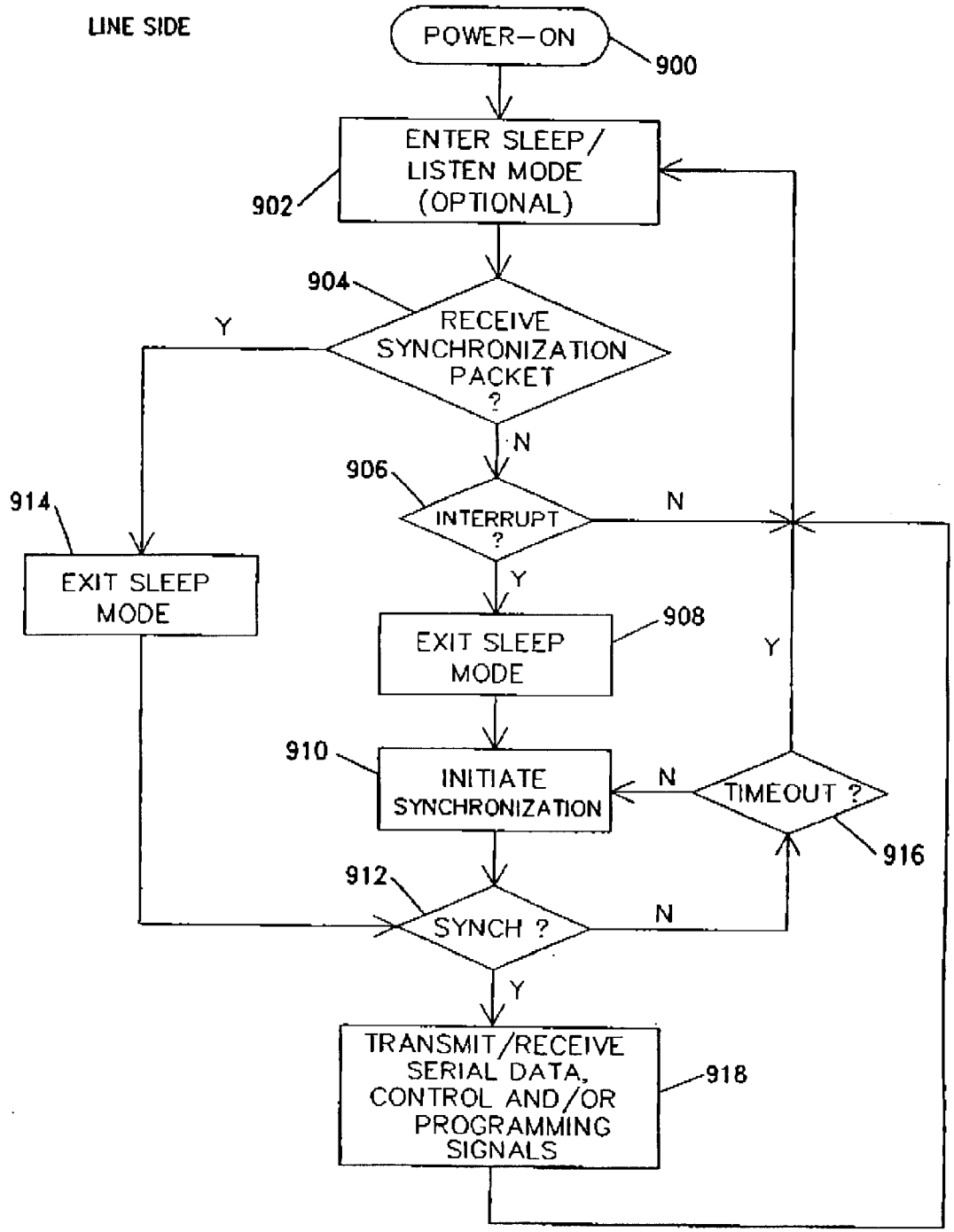
FIG. 9 is a flow chart depicting exemplary serial communication steps, performed by the line side circuitry of FIG. 1, in accordance with the present invention.

FIG. 9 is a flowchart showing exemplary serial communication steps performed in accordance with the present invention by the line side circuitry 102 of FIG. 1. Following power-on in step 900, the line side circuitry 102 enters an optional sleep or listen mode. Next, in step 904, the line side circuitry 102 determines if a synchronization packet has been received from the system side circuitry 104. If not, the line side circuitry determines (step 906) if an interrupt has been generated by any of the circuitry connected to the telephone network 110. If an interrupt has not been received, the process returns to step 902. If an interrupt has been received, the line side circuitry 102 exits sleep mode in step 908. A signal is then communicated to the system side circuitry 104 in step 910 to request synchronization. It is noted that the precise ordering of the steps 904–906 is not considered critical to the invention.

If a synchronization packet has been received as determined in step 904, the line side circuitry 102 exits sleep mode in step 914. Following either of steps 910 or 914, the line side circuitry 102 determines if synchronization with the system side circuitry 104 has been achieved. If not, a time-out counter is examined in step 916 to determine if a predetermined amount of time has expired without synchronization. If not, control turns to step 910 and synchronization is again initiated. If the time-out value has been reached, or if an interrupt was not found in step 906, step 902 is repeated and the line side circuitry enters an optional sleep or listen mode.

Thus, a DAA has been described in which the high voltage isolation barrier and other circuitry is configured such that data and control information are communicated between system side circuitry and line side circuitry using a serialized digital communication protocol. Many of the DAA functions can thereby be multiplexed into a single path across the high voltage isolation barrier, permitting the DAA to be constructed with a relatively inexpensive and physically compact high voltage isolation barrier.

In view of the above detailed description of the present invention and associated drawings, other modifications and variations will now become apparent to those skilled in the art. It should also be apparent that such other modifications and variations may be effected without departing from the spirit and scope of the present invention.

Appendix A is disclosed in U.S. Pat. No. 6,359,973 B1 (cols. 15–104). This disclosure is hereby incorporated by reference and corresponds to the Appendix A description that was deleted from the original a specification in this case.

What is claimed is:

1. A data access arrangement, comprising:
   a high voltage isolation barrier having a first side and a second side, and a first capacitor and a second capacitor;
   system side circuitry coupled to the first side of the high voltage isolation barrier, the system side circuitry configurable to communicate with host system circuitry and comprises a first transceiver circuit for bidirectional communications with the high voltage isolation barrier; and
   line side circuitry coupled to the second side of the high voltage isolation barrier, the line side configurable to communicate with a telephone network and comprises a second transceiver circuit for bidirectional communications with the high voltage isolation barrier, the first and second transceiver circuits configured to transmit/receive differential signals across the first and second capacitors to communicate the serialized digital information,
   wherein data and control information are communicated between the system side circuitry and the line side circuitry across the high voltage isolation barrier in a serialized digital format, wherein the high voltage isolation barrier further comprises circuitry configurable to provide a clock signal from the system side circuitry to the line side circuitry, and wherein the serialized digital information is communicated at approximately one half of the frequency of the clock signal.

2. The data access arrangement of claim 1, wherein the data and control information is multiplexed as part of the same serialized digital datastream.

3. The data access arrangement of claim 2, wherein the serialized digital datastream communicated between the system side circuitry and the line side circuitry is organized in frames having at least data portion and a control portion.

4. The data access arrangement of claim 1, wherein the serialized digital information contains error correction information relating to the data information.

5. The data access arrangement of claim 4, wherein the error correction information comprises redundant data information.

6. The data access arrangement of claim 1, wherein the serialized digital information contains synchronization bits for synchronizing serial communications between the system side circuitry and the line side circuitry.

7. The data access arrangement of claim 1, wherein the line side circuitry further comprises a coder/decoder, and wherein the serialized digital data information communicated between the system side circuitry and the line side circuitry includes encoded information generated by the coder/decoder and information for decoding by the coder/decoder.

8. The data access arrangement of claim 7, wherein the line side further circuitry comprises:
   a programmable circuit,
   wherein the system side circuitry multiplexes control information for the programmable circuit and the information for decoding by the coder/decoder and communicates the multiplexed information as part of the serialize digital information.

9. The data access arrangement of claim 8, wherein the programmable circuit is a line/ring impedance circuit.

10. The data access arrangement of claim 8, wherein the programmable circuit is a ring detection circuit.

11. The data access arrangement of claim 8, wherein the programmable circuit is a loop current measurement circuit.

12. The data access arrangement of claim 8, wherein the programmable circuit is a caller ID circuit.

13. The data access arrangement of claim 1, wherein the serialized digital control information communicated between the system side circuitry and the line side circuitry includes interrupt information.

14. The data access arrangement of claim 13, wherein the line side circuitry further comprises a ring detection circuit, and wherein the interrupt information is generated by the ring detection circuit.

15. A data access arrangement, comprising:
   a system side circuitry;
   a programmable line side circuitry;
   a digital isolation barrier that communicatively couples the system side circuitry and the programmable line side circuitry;
   the programmable line side circuitry is operable to communicate across a telephone network, the programmable line side circuitry is also operable to be reconfigured based on information indicative of a condition of the telephone network; and
   the system side circuitry is operable to communicate with a host system circuitry;
   the digital isolation barrier is operable to communicate data and control information in a multiplexed, serialized digital datastream between the system side circuitry and the programmable line side circuitry.

16. The data access arrangement of claim 15 wherein the programmable line side circuitry identifies the information indicative of the condition of the telephone network; and
   the programmable line side circuitry is reconfigured based on the information indicative of the condition of the telephone network to facilitate improved communication across the telephone network.

17. The data access arrangement of claim 16 wherein the programmable line side circuitry is reconfigured in real time.

18. A computer system, comprising:
   a data bus;
   a processor coupled to the data bus; and
   a modem coupled to the data bus, the modem comprising:
      a high voltage isolation barrier having a first side and a second side;
      system side circuit coupled to the first side of the high voltage isolation barrier, the system side circuitry configurable to communicate with host system circuitry; and
      line side circuitry coupled to the second side of the high voltage isolation barrier, the line side configurable to communicate with a telephone network,
      wherein data and control information are communicated between the system side circuitry and the line side circuitry across the high voltage isolation barrier in a serialized digital format.

19. The computer system of claim 18, wherein the serialized digital information contains synchronization information for synchronizing serial communications between the system side circuitry and the line side circuitry.

20. The computer system of claim 18, wherein the line side circuitry of the modem further comprises a coder/decoder, and wherein the serialized digital data information communicated between the system side circuitry and the line side circuitry includes encoded information generated by the coder/decoder and information for decoding by the coder/decoder.

* * * * *